Patented Dec. 17, 1946

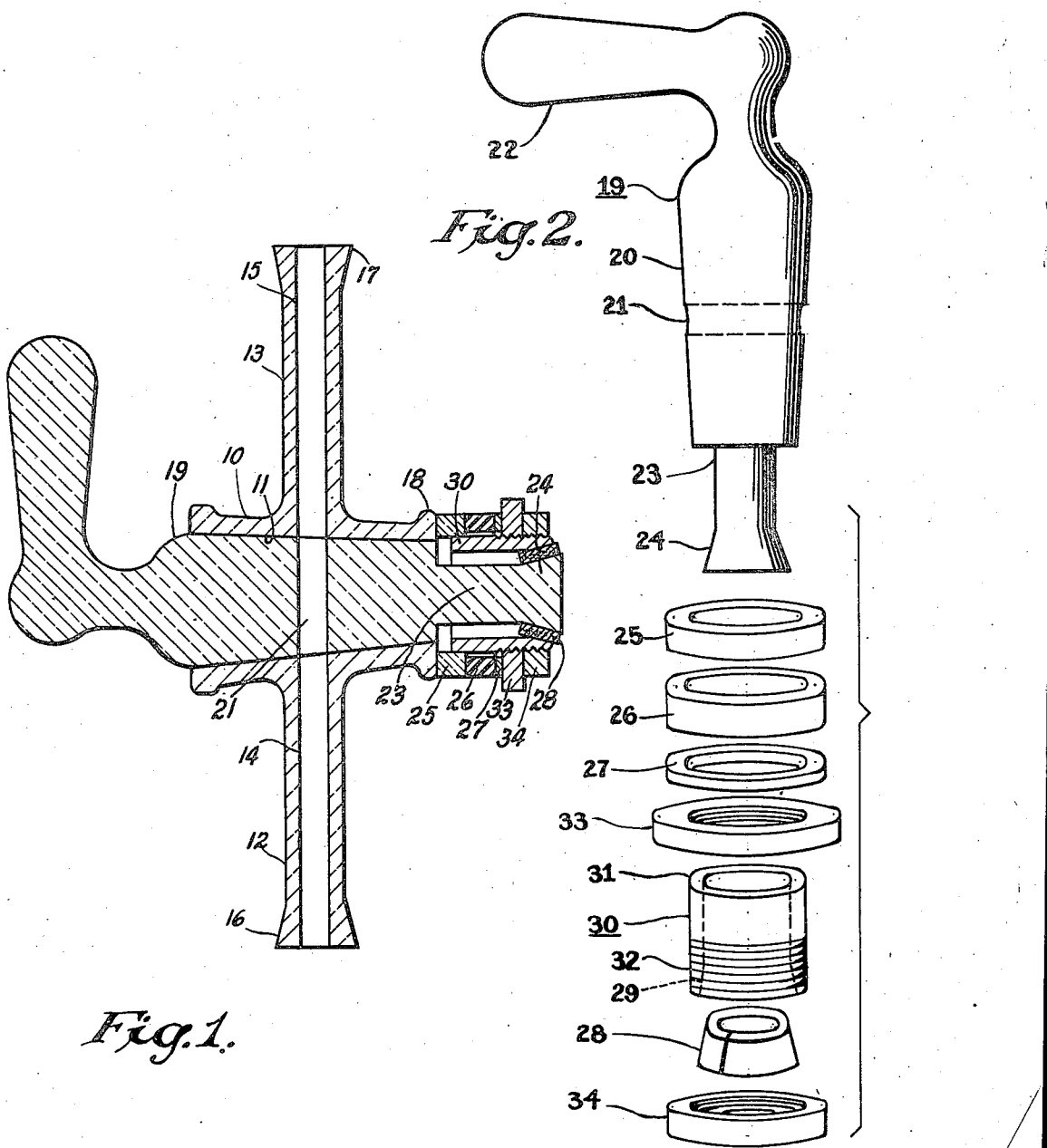

2,412,597

UNITED STATES PATENT OFFICE 2,412,597

STOPCOCK

Nathaniel Brewer, Newtown, Pa., assignor to Fischer & Porter Company, Hatboro, Pa., a corporation of Pennsylvania Application March 1, 1944, Serial No. 524,577

8 Claims. (Cl. 251—112)

The present invention relates to stop-cocks adapted for use in fluid lines or the like and it relates more particularly to a new and improved stop-cock construction suitable for use in high pressure fluid lines.

An object of the present invention is to provide a new and improved stop-cock suitable for use in high pressure fluid lines or the like. Another object of the present invention is to provide a stop-cock of glass or the like suitable for use under high fluid pressures. Still another object of the present invention is to provide a stop-cock having a housing and an apertured plug both of glass or other chemically resistant but relatively frangible material and having means for securely anchoring the plug within the housing so as to withstand relatively high fluid pressures.

Other objects and advantages of the present invention are apparent in the following detailed description, appended claims and accompanying drawing.

In chemical plants and laboratories, etc., it is frequently necessary to provide fluid lines which are resistant to corrosion and chemical attack by fluids required to be moved therethrough, and it is frequently also necessary to provide stop-cocks within said fluid lines to control and adjust the flow of fluid.

Thus, for example, acids and many other chemicals attack steel, cast-iron, brass, copper and other materials of which pipe lines are ordinarily constructed.

In such cases, it is frequently desirable to construct the fluid line and the stop-cocks therefor of glass which is resistant to all ordinary chemicals except hydrofluoric acid.

By employing glass of relatively high strength or by suitably reinforcing the glass fluid line, it is possible to carry fluids under relatively high pressures therethrough.

However, ordinary glass stop-cocks of conventional construction have presented considerable difficulties in the handling of high pressure fluids since, at high pressures, there is a tendency to force the plug of the stop-cock out of the body or housing thereof and since, due to the frangibility of glass, it is impossible to anchor the plug within the body or housing by conventional means employed with stop-cocks or valves made of metal or the like.

Accordingly, the present invention contemplates a new and improved stop-cock construction which permits the plug of a stop-cock made of glass or other frangible material to be firmly anchored within the body or housing thereof so as to permit the stop-cock to be used in high pressure fluid lines.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1 represents a cross-sectional view of one embodiment of the present invention as it appears when assembled.

Figure 2 represents an exploded view, partly in elevation and partly in perspective, of the plug and associated parts of the embodiment of Figure 1.

In the embodiment of Figures 1 and 2, I may provide a body or housing indicated generally by the reference character 10. The body or housing 10 is preferably formed of pyrex, glass or other suitable chemically resistant material capable of withstanding fairly high pressures.

The body or housing 10 is provided with a tapered inner bore 11 which is carefully ground to predetermined dimensions so as to form a fluid-tight seal with a correspondingly ground plug member to be hereinafter described.

The body or housing 10 is provided with a pair of aligned oppositely extending arms 12 and 13 formed integrally therewith. The arms 12 and 13 are axially apertured as at 14 and 15; the apertures 14 and 15 communicating with the inner bore 11 at diametrically opposed points.

The outer ends of the arms 12 and 13 may be flared as at 16 and 17 so as to provide shoulders which aid in retaining in position any suitable resilient tubing (not shown) for connecting the arms 12 and 13 to a pipe-line or the like.

An annular shoulder 18 is provided upon the body or housing 10 adjacent the smaller end of the tapered inner bore 11 thereof.

A plug indicated generally by the reference character 19 is provided with a carefully ground tapered portion 20 adapted to fit within the inner bore 11 of the body or housing 10. As stated hereinabove, the tapered portion 20 of the plug 19 and the inner bore 11 of the body or housing 10 are carefully ground or otherwise formed to exact predetermined dimensions so that, when the tapered portion 20 of the plug 19 is seated within the inner bore 11 of the body or housing 10, a fluid-tight seal will be established therebetween.

The tapered portion 20 is provided with an opening 21 extending transversely therethrough and adapted, when in the position shown in Figure 1, to connect the openings 14 and 15 of the arms 12 and 13 of the body or housing 10.

As is well known in the stop-cock art, rotation of the plug 19 within the body or housing 10 to a position at right angles to that shown in Figure 1 will break the connection between the apertures 14 and 15 and will establish a fluid-tight seal therebetween.

The plug 19 is provided with a handle 22 adjacent the larger end of the tapered portion 20 thereof.

A tail piece 23 having a reduced transverse dimension extends from the smaller end of the tapered portion 20 of the plug 19 outwardly beyond the shoulder 18 of the body or housing 10. The tail piece 23 is flared at its outer end as at 24 so as to provide an annular inclined shoulder thereon.

A ring 25 of synthetic plastic or the like is seated against the shoulder 18 of the body or housing 10. A ring 26 of neoprene or other suitable resilient material is seated against the outer edge of the plastic ring 25 and a relatively thin metal washer 27 is seated against the outer edge of the neoprene ring 26.

A split frusto-conical packing ring 28 of asbestos composition or other suitable material is seated about the flared end 24 of the tail piece 23 and is held thereon by the conical bore 29 formed on the outer end of a tubular member 30 of metal or the like; the inner end 31 of said tubular member 30 being slidably positioned within the plastic ring 25.

The tubular member 30 is externally screw-threaded along its outer end as at 32 and an internally screw-threaded metal adjusting nut 33 is adjustably connected thereon.

An internally threaded metal lock nut 34 is adjustably mounted upon the screw threads 32 of said tubular member 30 outside of the adjusting nut 33.

In assembling the novel stop-cock of the present invention, the plug 19 may first be seated within the body or housing 10, the split packing ring 28 may then be forced over the tail piece 23 (above the flared end 24 thereof), and the tubular member 30 may then be slipped over the flared end 24. The split ring 28 may then be moved outwardly and onto the flared end 24 of the tail piece 23 and the tubular member 30 may be moved outwardly so as to bring the conical bore 29 thereof against the outer periphery of the split ring 28.

The plastic ring 25, the neoprene ring 26 and the metal washer 27 may then be positioned about the tubular member 30 and against the shoulder 18 of the body or housing 10.

The adjusting nut 33 is then screw-threadedly connected upon the outer end of the screw threads 32 of the tubular member 30 and screwed inwardly.

It is evident that, as the adjusting nut 33 is tightened, the rings 25 and 26 and the washer 27 are forced inwardly against the shoulder 18 while the tubular member 30 is forced outwardly against the split ring 28. Thus, tightening of the adjusting nut 33 tends to force the tail piece 23 outwardly and thus tends to hold the plug 19 in position within the body or housing 10.

The plastic ring 25, being softer than the glass of the body or housing 10, prevents scoring or chipping of the glass of said body or housing 10. The resilient neoprene ring, which is compressed somewhat upon tightening of the adjusting nut 33, maintains an outward pressure upon the tail piece 23.

The lock nut 34 which is screwed on after the adjusting nut 33 has been adjusted to exert the proper predetermined pressure upon the plug 19, is screwed up against the outer edge of the adjusting nut 33 and thus prevents it from working loose.

It is apparent that, by the novel construction of the present invention, the plug 19 is held firmly within the body or housing 10 so as to enable the stop-cock to be used under relatively high fluid pressures, while, at the same time, the glass surfaces of the plug and the housing are protected against scoring or chipping or breaking.

While, for purposes of illustration, a stop-cock having two arms is shown in the drawing, the novel construction of the present invention is adapted equally well for use on stop-cocks having three or more connections, and such use is within the scope of the present invention.

The arms 12 and 13 of the stock-cock, instead of being connected within the fluid line by flexible tubing, may be permanently connected thereto by fusing the ends directly to the glass pipe-line, as is well known in the art.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention, what I claim as new and desire to protect by Letters Patent is:

1. A stop-cock comprising a housing having a tapered inner bore, an apertured tapered plug rotatably mounted within said inner bore in fluid-tight relationship therewith, said plug having a tail-piece extending from the smaller end thereof beyond said housing, means for retaining said plug within said bore, said retaining means including telescopically adjustable means adapted oppositely to bear against said housing and said tail-piece, and separate compressible members positioned intermediate said retaining means and said housing and tail-piece respectively.

2. A stop-cock adapted for use in controlling high-pressure flow of chemically active fluids, said stop-cock comprising a housing of glass or the like having a tapered inner bore and having a plurality of openings leading from said inner bore, an apertured tapered plug of glass or the like rotatably mounted within said inner bore in fluid-tight relationship therewith, said plug having a tail-piece extending from the smaller end thereof beyond said housing, means for retaining said plug within said bore, said retaining means including telescopically adjustable means adapted oppositely to bear against said housing and said tail-piece, and separate compressible members positioned intermediate said retaining means and said housing and tail-piece respectively.

3. A stop-cock adapted for use in controlling high-pressure flow of chemically active fluids, said stop-cock comprising a housing of glass or the like having a tapered inner bore and having a plurality of openings leading from said inner bore, an apertured tapered plug of glass or the like rotatably mounted within said inner bore in fluid-tight relationship therewith, said plug having a tail-piece extending from the smaller end thereof beyond said housing, and means for retaining said plug within said bore against the fluid-pressure, said retaining means including a compressible member mounted on the end of said tail-piece, a separate resilient member bearing against said housing, and adjustable means for outwardly tensioning said compressible member and said tail-piece, said adjustable means being seated against said resilient members and bearing against said resilient member.

4. A stop-cock adapted for use in controlling high-pressure flow of chemically active fluids, said stock-cock comprising a housing of glass or the like having a tapered inner bore and having a plurality of openings leading from said inner bore, an apertured tapered plug of glass or the like rotatably mounted within said inner bore in fluid-tight relationship therewith, said plug having a tail-piece extending from the smaller end thereof beyond said housing, and means for retaining said plug within said bore against the fluid-pressure, said retaining means including a compressible member mounted on the end of said tail-piece, a separate resilient member bearing against said housing, and telescopically adjustable means seated against said resilient member and bearing against said compressible member for outwardly tensioning said tail-piece.

5. A stop-cock adapted for use in controlling high-pressure flow of chemically active fluids, said stop-cock comprising a housing of glass or the like having a tapered inner bore and having a plurality of openings leading from said inner bore and having a shoulder formed thereon adjacent the smaller end of said bore, an apertured tapered plug of glass or the like rotatably mounted within said inner bore in fluid-tight relationship therewith, said plug having a tail-piece extending from the smaller end thereof beyond said housing and means for retaining said plug within said bore against the fluid-pressure, said retaining means including a relatively soft ring of synthetic plastic or the like seated against said shoulder, a resilient ring of synthetic rubber or the like seated against said plastic ring, a split packing-ring mounted on the free end of said tail-piece, and screw-threadedly adjustable means seated against said resilient ring for outwardly tensioning said packing-ring and said tail-piece.

6. A stop-cock adapted for use in controlling high-pressure flow of chemically active fluids, said stop-cock comprising a housing of glass or the like having a tapered inner bore and having a plurality of openings leading from said inner bore and having a shoulder formed thereon adjacent the smaller end of said bore, an apertured tapered plug of glass or the like rotatably mounted within said inner bore in fluid-tight relationship therewith, said plug having a tail-piece extending from the smaller end thereof beyond said housing, said tail-piece being flared at its outer end, and means for retaining said plug within said bore against the fluid pressure, said retaining means including a resilient member bearing against said shoulder, a split packing-ring mounted upon the flared end of said tail-piece, and adjustable means oppositely bearing against said resilient member and said packing-ring, thereby outwardly to tension said tail-piece relative to said shoulder.

7. A stop-cock adapted for use in controlling high-pressure flow of chemically active fluids, said stop-cock comprising a housing of glass or the like having a tapered inner bore and having a plurality of openings leading from said inner bore and having a shoulder formed thereon adjacent the smaller end of said bore, an apertured tapered plug of glass or the like rotatably mounted within said inner bore in fluid-tight relationship therewith, said plug having a tail-piece extending from the smaller end thereof beyond said housing, said tail-piece being flared at its outer end, and means for retaining said plug within said bore against the fluid pressure, said retaining means including a relatively soft ring of synthetic plastic or the like seated against said shoulder, a resilient ring of synthetic rubber or the like seated against said plastic ring, a split frusto-conical packing-ring mounted on the flared end of said tail-piece, and screw-threadedly adjustable means seated against said resilient ring for outwardly tensioning said packing-ring and said tail-piece.

8. A stop-cock adapted for use in controlling high-pressure flow of chemically active fluids, said stop-cock comprising a housing of glass or the like having a tapered inner bore and having a plurality of openings leading from said inner bore and having a shoulder formed thereon adjacent the smaller end of said bore, an aperture tapered plug of glass or the like rotatably mounted within said inner bore in fluid-tight relationship therewith, said plug having a tail-piece extending from the smaller end thereof beyond said housing, said tail-piece being flared at its outer end, and means for retaining said plug within said bore against the fluid pressure, said retaining means including a relatively soft ring of synthetic plastic or the like seated against said shoulder, a resilient ring of synthetic rubber or the like seated against said plastic ring, a metallic washer seated against said resilient ring, a split-frusto-conical packing-ring mounted on the flared end of said tail-piece, a generally tubular externally screw-threaded member bearing against said packing-ring and an internally screw-threaded nut mounted upon said tubular member and bearing against said metal washer, said nut being axially adjustable along said tubular member thereby outwardly to tension said tail-piece relative to said housing.

NATHANIEL BREWER.